US010785991B2

(12) United States Patent
Sanguansri et al.

(10) Patent No.: US 10,785,991 B2
(45) Date of Patent: Sep. 29, 2020

(54) ENCAPSULATION METHOD

(71) Applicant: Commonwealth Scientific and Industrial Research Organisation, Campbell (AU)

(72) Inventors: Luz Sanguansri, Tarneit (AU); Mary Ann Augustin, Wheelers Hill (AU); Zhiping Shen, Wyndham Vale (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 377 days.

(21) Appl. No.: 14/785,482

(22) PCT Filed: Jul. 12, 2013

(86) PCT No.: PCT/AU2013/000775
§ 371 (c)(1),
(2) Date: Oct. 19, 2015

(87) PCT Pub. No.: WO2014/169315
PCT Pub. Date: Oct. 23, 2014

(65) Prior Publication Data
US 2016/0058039 A1 Mar. 3, 2016

(30) Foreign Application Priority Data
Apr. 19, 2013 (AU) ................. 2013901379

(51) Int. Cl.
*A23D 7/01* (2006.01)
*A23D 7/02* (2006.01)
*A23D 7/06* (2006.01)
*A23L 7/165* (2016.01)
*A23L 33/115* (2016.01)
*A23P 10/30* (2016.01)

(52) U.S. Cl.
CPC ................ *A23D 7/011* (2013.01); *A23D 7/02* (2013.01); *A23D 7/06* (2013.01); *A23L 7/165* (2016.08); *A23L 33/115* (2016.08); *A23P 10/30* (2016.08); *A23V 2002/00* (2013.01)

(58) Field of Classification Search
CPC . A23P 10/30; A23P 10/35; A23D 7/00; A23D 7/011; A23D 7/02; A23D 7/06; A23L 33/115; A23L 7/165
USPC ......................................... 426/103
See application file for complete search history.

(56) References Cited

U.S. PATENT DOCUMENTS

| 8,048,652 B2 | 11/2011 | Fichtali et al. | |
|---|---|---|---|
| 2006/0286205 A1* | 12/2006 | Fichtali | A23J 3/347 426/7 |
| 2007/0104866 A1* | 5/2007 | McClements | A23D 7/0053 427/213.3 |
| 2007/0218125 A1 | 9/2007 | Head et al. | |
| 2008/0026108 A1 | 1/2008 | Subramanian et al. | |
| 2008/0095907 A1 | 4/2008 | Augustin et al. | |
| 2011/0059164 A1 | 3/2011 | Hendrickson et al. | |
| 2012/0288533 A1 | 11/2012 | Livney | |
| 2012/0321720 A1* | 12/2012 | Driscoll | A61K 31/6615 424/522 |

OTHER PUBLICATIONS

Krill Oil: This Almost Perfect Natural Oil Could Slow Down Your Aging Clock by Dr. Mercola, Aug. 26, 2011 Obtained from https://articles.mercola.com/sites/articles/archive/2011/08/26/how-can-this-oil-help-you-beat-these-24-common-diseases.aspx (Year: 2011).*

* cited by examiner

*Primary Examiner* — Jyoti Chawla
(74) *Attorney, Agent, or Firm* — Banner & Witcoff, Ltd.

(57) ABSTRACT

A method of preparing an encapsulated phospholipid oil-in-water emulsion comprising: preparing an oil-in-water pre-emulsion comprising a phospholipid-containing oil and mixing the oil-in-water pre-emulsion with an encapsulant material.

15 Claims, 4 Drawing Sheets

ENCAPSULATION METHOD

RELATED APPLICATION DATA

This application is a National Stage Application under 35 U.S.C. 371 of PCT application number PCT/AU2013/000775 designating the United States and filed Jul. 12, 2013; which claims the benefit of AU application number 2013901379 and filed Apr. 19, 2013 each of which are hereby incorporated by reference in their entireties.

FIELD

The invention relates generally to encapsulated phospholipid-containing oils, such as krill oil. The invention also relates to methods for encapsulating phospholipid-containing oils.

BACKGROUND

Omega-3 fatty acids are essential fatty acids which cannot be synthesised by the human body and must therefore be consumed through food or supplements.

Omega-3 fatty acids have many potential health benefits including promoting brain function and normal growth and development, they may also reduce the risk of heart disease. As a consequence of the potential health benefits, there is an increasing demand for sustainable sources of omega-3-fatty acid ingredients.

Omega-3 fatty acids can be found in fish, including salmon and tuna, and other marine sources, including algae and krill. Krill oil is one option for a sustainable source of omega-3 fatty acids. Krill oil is rich in phospholipid omega-3 fatty acids and may be considered as an alternative source of omega-3 oils to fish and algal oils. Phospholipid omega-3 fatty acids have advantages such as improved bioavailability compared with triglyceride omega-3 fatty acids. However, direct incorporation of krill oil into foods presents problems due to the strong flavour and odour of the oil and the risk of oxidation of the highly unsaturated omega-3 fatty acids in the oil.

There is therefore a need to develop a system for delivering phospholipid omega-3 fatty acid containing oils, such as krill oil, which masks the strong flavour and odour and/or reduces the risk of oxidation of the fatty acids in the oil.

SUMMARY

The method of the present invention takes advantage of the inherent emulsifying properties of phospholipid containing oils, such as krill oil, to enable the formation of neat oil-in-water emulsions in which the oil/water interface is comprised of phospholipids. This neat oil-in-water emulsion, or oil-in-water pre-emulsion, is then encapsulated or embedded within an encapsulant material which stabilises the omega-3 fatty acids in the oil against oxidation and masks undesirable flavour and aromas.

According to a first aspect, there is provided a method of preparing an encapsulated phospholipid oil-in-water emulsion comprising: preparing an oil-in-water pre-emulsion comprising a phospholipid-containing oil and mixing the oil-in-water pre-emulsion with an encapsulant material.

In one embodiment of the first aspect, there is provided a method of preparing an encapsulated phospholipid oil-in-water emulsion comprising: preparing an oil-in-water pre-emulsion comprising a phospholipid-containing oil and mixing the oil-in-water pre-emulsion with an encapsulant material consisting of a protein, a carbohydrate or a Maillard reaction product.

In another embodiment of the first aspect, there is provided a method of preparing an encapsulated phospholipid oil-in-water emulsion comprising: preparing an oil-in-water pre-emulsion comprising a phospholipid-containing oil and mixing the oil-in-water pre-emulsion with an encapsulant material consisting of a carbohydrate or a Maillard reaction product.

According to a second aspect, there is provided an encapsulated phospholipid oil-in-water emulsion prepared by the above method. There is also provided an encapsulated phospholipid oil-in-water emulsion obtainable by the above method.

The above method encapsulates an oil-in-water pre-emulsion comprising a phospholipid-containing oil in an encapsulant material. Thus, according to a third aspect, there is provided an encapsulated phospholipid oil-in-water emulsion comprising an oil-in-water pre-emulsion comprising a phospholipid-containing oil, wherein the oil-in-water pre-emulsion is encapsulated or embedded in an encapsulant material.

In one embodiment of the third aspect, there is provided an encapsulated phospholipid oil-in-water emulsion comprising an oil-in-water pre-emulsion comprising a phospholipid-containing oil, wherein the oil-in-water pre-emulsion is embedded in an encapsulant material consisting of a protein, a carbohydrate or a Maillard reaction product.

In another embodiment of the third aspect, there is provided an encapsulated phospholipid oil-in-water emulsion comprising an oil-in-water pre-emulsion comprising a phospholipid-containing oil, wherein the oil-in-water pre-emulsion is embedded in an encapsulant material consisting of a carbohydrate or a Maillard reaction product.

BRIEF DESCRIPTION OF THE DRAWINGS

The invention will be described in further detail, by way of example only, with reference to the following Figures:

FIG. 4 (column I) is a series of graphs showing the particle size distribution of (1) krill oil-in-water pre-emulsion (10% krill oil) and encapsulated krill oil-in-water emulsions prepared in different ways (2) krill oil-in-water pre-emulsion+1% fish gelatine, (3) krill oil-in-water pre-emulsion+3% heated protein-carbohydrate, compared to the conventional method of emulsion preparation (4) homogenised mixture of neat krill oil and 3% heated protein-carbohydrate.

FIG. 4 (column II) is a series of graphs showing the particle size distribution of emulsions with added maltodextrin prepared according to the present application, including: (P1) krill oil-in-water pre-emulsion (10% krill oil)+maltodextrin before drying, (P2) krill oil-in-water pre-emulsion+1% fish gelatine+maltodextrin before drying, and (P3) krill oil-in-water pre-emulsion+3% heated protein-carbohydrate+maltodextrin, compared to the conventional method of emulsion preparation: (P4) homogenised mixture of neat krill oil and 3% heated protein-carbohydrate. Maltodextrin is added as a carrier to aid in drying the emulsions into powder.

FIG. 4 (column III) is a series of graphs showing the particle size distribution of reconstituted powder from spray dried emulsions prepared according to the present application, including: (P1) krill oil-in-water pre-emulsion (10% krill oil) (P2) krill oil-in-water pre-emulsion+1% fish gelatine, and (P3) krill oil-in-water pre-emulsion+3% heated protein-carbohydrate, compared to the conventional method of emulsion preparation: (P4) homogenised mixture of neat krill oil and 3% heated protein-carbohydrate.

The particle size distribution of the emulsions made using the process of embodiments of the present application (namely P1, P2, P3) is different to the particle size distribution made using the conventional process (P4). But the particle size of the reconstituted powder from spray dried emulsions were similar.

Figure 5:
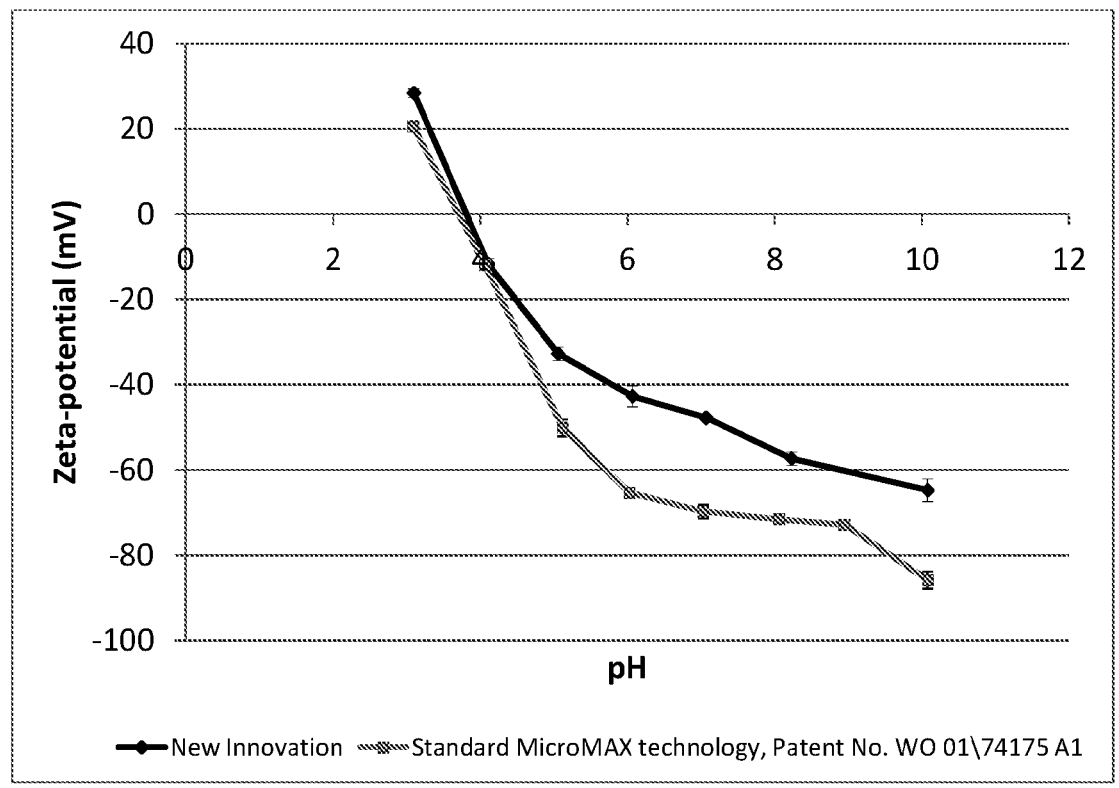

FIG. 5 is a graph showing the zeta potential versus pH of a 10% krill oil-in-water pre-emulsion+3% heated protein-carbohydrate prepared by the method of one embodiment of the present invention compared to the conventional method of emulsion preparation, homogenised mixture of neat krill oil+3% heated protein-carbohydrate.

Figure 6:
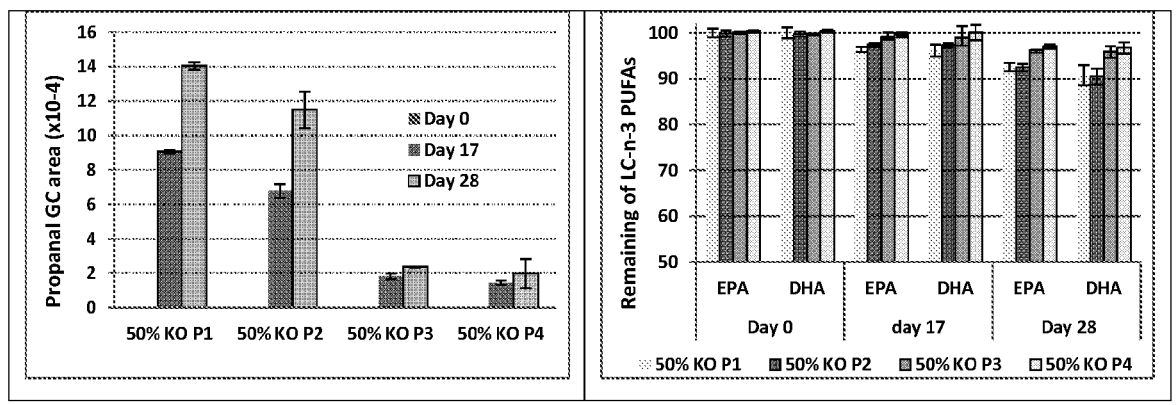

FIG. 6 shows the oxidative stability of the powders on storage at 40° C. for 28 days.

DETAILED DESCRIPTION

The invention relates generally to encapsulated phospholipid-containing oils, such as krill oil. The invention also relates to methods for encapsulating phospholipid-containing oils.

In the following, we have described features of the method and the encapsulated phospholipid-containing oils. All features described below apply independently to the methods and the products of the invention.

The method of the present invention takes advantage of the inherent emulsifying properties of phospholipid containing oils, such as krill oil, to enable the formation of neat oil-in-water emulsions in which the oil/water interface is comprised of phospholipids. This neat oil-in-water emulsion, or oil-in-water pre-emulsion is then encapsulated or embedded within an encapsulant material which stabilises the omega-3 fatty acids in the oil against oxidation and masks undesirable flavour and aromas.

Figure 1:
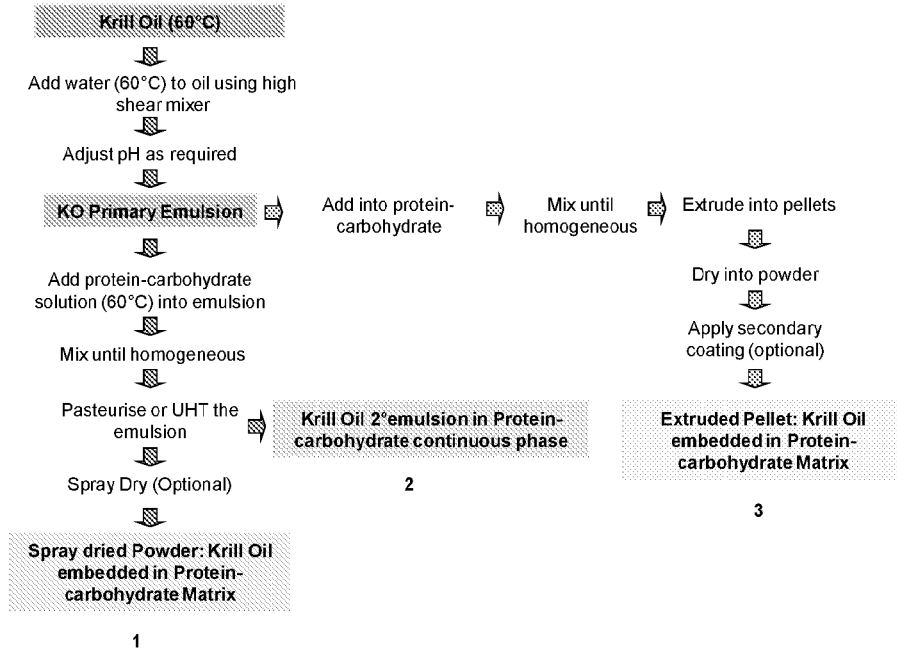
FIG. 1 is a schematic illustration showing the method of some of the embodiments of the invention.

It is an advantage of the method of the invention that the encapsulated phospholipid oil-in-water emulsion of the invention can be provided in alternative formats. In one embodiment, the encapsulated phospholipid oil-in-water emulsion is provided as an emulsion (FIG. 1 (2)). In another embodiment, the encapsulated phospholipid oil-in-water emulsion can be provided as a powder (FIG. 1 (1)) and in yet another embodiment, the encapsulated phospholipid oil-in-water emulsion can be provided as a pellet with or without additional coatings (FIG. 1 (3)). The encapsulated phospholipid oil-in-water emulsion can also be provided as intermediate moisture products (for example gels or pastes) or dried formats (for example flakes).

It is a further advantage of the invention that the encapsulated phospholipid oil-in-water emulsion of the invention can be incorporated into a range of functional food/beverage products. In particular, it is an advantage that the encapsulated phospholipid oil-in-water emulsion can be incorporated into aqueous based food products such as yoghurt and protein based beverages, or in extruded products such as noodles, cereals and expanded snacks.

Oil-in-Water Pre-Emulsion

The method of the present invention involves the step of preparing a neat oil-in-water emulsion, or oil-in-water pre-emulsion, comprising a phospholipid-containing oil.

The term "neat" as used herein in the context of a "neat oil-in-water emulsion" means that the oil-in-water emulsion consists essentially of oil and water.

The preparation of an oil-in-water pre-emulsion comprising a phospholipid-containing oil takes advantage of the inherent emulsifying properties of phospholipid containing oils to form an oil-in-water pre-emulsion in which the oil/water interface is comprised of phospholipids. This oil-in-water pre-emulsion is then encapsulated or embedded within an encapsulant material which stabilises the omega-3 fatty acids in the oil against oxidation and masks undesirable flavour and aromas.

The formation of an oil-in-water pre-emulsion comprising the phospholipid-containing oil makes the encapsulated oil-in-water emulsion water soluble which provides the advantage that the encapsulated phospholipid oil-in-water emulsion can be incorporated into aqueous based food products The oil-in-water pre-emulsion may be prepared by mixing the phospholipid-containing oil with an aqueous solution. The oil-in-water pre-emulsion is preferably prepared by mixing the phospholipid-containing oil with water. In one embodiment, the mixing occurs by homogenisation. The phospholipid-containing oil and aqueous solution may be homogenised or the phospholipid-containing oil and aqueous solution may be mixed until homogeneous. In one preferred embodiment, the homogenisation is by high shear mixing. The homogenisation may be high-pressure or low-pressure homogenisation. Any homogenisation pressure used in the art to homogenise an emulsion without aggregation may be used in the method of the present invention. For example, the homogenisation pressure may be up to about 1000 bar, or up to about 500 bar, or up to about 200 bar. In some embodiments, the phospholipid-containing oil and aqueous solution are homogenised at a temperature of at least about 10° C. In some embodiments, the phospholipid-containing oil and aqueous solution are homogenised at a temperature of at least about 20° C.

In some embodiments, the aqueous solution is added to the phospholipid-containing oil. In other embodiments, the phospholipid-containing oil is added to the aqueous solution.

In one embodiment, the phospholipid-containing oil is heated before mixing with an aqueous solution. In one embodiment, the phospholipid-containing oil is heated to at least about 60° C. before mixing with an aqueous solution. For example, the phospholipid-containing oil may be heated to at least about 70° C., or at least about 80° C., or at least about 90° C. before mixing with an aqueous solution.

In another embodiment, the aqueous solution is heated before mixing with the phospholipid-containing oil. In one embodiment, the aqueous solution is heated to at least about 60° C. before mixing with the phospholipid-containing oil. For example, the aqueous solution may be heated to at least about 70° C., or at least about 80° C., or at least about 90° C. before mixing with the phospholipid-containing oil.

In one embodiment both the phospholipid-containing oil and the aqueous solution are heated independently before mixing to the form oil-in-water pre-emulsion. In one embodiment, the aqueous solution and phospholipid-containing oil are heated independently to at least about 60° C. before mixing together. For example, the aqueous solution and phospholipid-containing oil may be independently heated to at least about 70° C., or at least about 80° C., or at least about 90° C. before mixing together.

In another embodiment, the aqueous solution and phospholipid-containing oil are heated after they have been mixed together. For example, the aqueous solution and phospholipid-containing oil may be mixed to form an oil-in-water pre-emulsion and then heated. In one embodiment, oil-in-water pre-emulsion is heated to at least about 60° C. For example, the oil-in-water pre-emulsion may be heated to at least about 70° C., or at least about 80° C., or at least about 90° C.

In some embodiments, it is necessary to adjust the pH of the oil-in-water pre-emulsion before mixing the oil-in-water pre-emulsion with an encapsulant material. The optimum pH for the oil-in-water pre-emulsion is the pH at which the oil-in-water pre-emulsion is most stable. In one embodiment, the pH of the oil-in-water pre-emulsion is adjusted to about 4 to about 10. For example, the pH may be adjusted to about 5 to about 9, or to about 6 to about 8 or to about 7. Preferably, the pH is adjusted to about 6 to about 8. For example, the pH may be adjusted to about pH 6, or about pH 7 or about pH 8.

Adjustment of the pH may be undertaken by any method known in the art.

The oil-in-water pre-emulsion preferably has a particle size (before or after adjustment of the pH) of about 100 nanometres to about 3 microns. For example, the oil-in-water pre-emulsion may have a particle size of about 300 nanometres to about 2 microns, or about 500 nanometres to about 1 micron. In some embodiments, the oil-in-water pre-emulsion has a particle size of less than about 2 micron. For example, the oil-in-water pre-emulsion may have a particle size of less than about 1 micron, or less than about 500 nanometres, or less than about 300 nanometres. As demonstrated in the examples, the particle size distribution of the emulsions made in accordance with embodiments of the present application is different to the particle size distribution of emulsions using the prior art processes such as the MicroMAX process. However, the particle size of the reconstituted powder from spray dried emulsions was similar to the emulsions made in accordance with embodiments of the present application.

The phospholipid-containing oil may be any oil which comprises a phospholipid. Preferably, the phospholipid-containing oil comprises up to about 50% by weight phospholipids. For example, the phospholipid-containing oil may comprise up to about 40% by weight phospholipids, or up to about 30% by weight phospholipids, or up to about 20% by weight phospholipids.

In some embodiments, the phospholipid-containing oil comprises at least about 20% by weight phospholipids. For example, the phospholipid-containing oil may comprise at least about 30% by weight phospholipids, or at least about 40% by weight phospholipids.

In some embodiments, the phospholipid-containing oil comprises about 20% to about 50% by weight phospholipids. For example, the phospholipid-containing oil may comprise about 30% to about 40% by weight phospholipids. In one particularly preferred embodiment, the phospholipid-containing oil comprises about 40% by weight phospholipids. For example, krill oil contains about 40% by weight phospholipids.

The phospholipids in the phospholipid containing oil may be any phospholipids known in the art.

In some embodiments, the phospholipids in the phospholipid containing oil are selected from the group consisting of phosphophatidylcholines, lysophosphatidylcholines, phosphatidylethanolamines, phospahtidylinositol and phosphatidylserine and combinations thereof. For example, krill oil comprises phosphophatidylcholines, lysophosphatidylcholines and phosphatidylethanolamines.

In some embodiments, the phospholipid containing oil comprises about 20% to about 50% by weight of phosphatidylcholines. For example, the phospholipid containing oil may comprise about 30% to about 40% by weight of phosphophatidylcholines. In the case of krill oil, the amount of phosphophatidylcholines is about 35% by weight.

In some embodiments, the phospholipid containing oil comprises about 2% to about 4% by weight of lysophosphatidylcholines. For example, the phospholipid containing oil may comprise about 2.5% to about 3.5% by weight of lysophosphatidylcholines. In the case of krill oil, the amount of lysophosphatidylcholines is about 3% by weight.

In some embodiments, the phospholipid containing oil comprises about 1% to about 3% by weight of phosphatidylethanolamines. For example, the phospholipid containing oil may comprise about 1.5% to about 2.5% by weight of phosphatidylethanolamines. In the case of krill oil, the amount of phosphatidylethanolamines is about 2% by weight.

The phospholipid-containing oil may comprise other lipids, for example, triacylglycerols, diacylglycerols, monoacylglycerols, free fatty acids and cholesterol. In some embodiments, the balance of the phospholipid-containing oil is made up of lipids, for example, triacylglycerols, diacylglycerols, monoacylglycerols, free fatty acids and/or cholesterol. In the case of krill oil, the balance of the krill oil is made up of triacylglycerols, diacylglycerols, monoacylglycerols, free fatty acids and cholesterol.

Examples of triacylglycerols which may be present in the phospholipid-containing oil include docosahexaenoic acid and eicosapentaenoic acid. In some embodiments, the phospholipid-containing oil comprises about 30% to about 50% by weight of triacylglycerols. For example, the phospholipid-containing oil may comprise about 35% to about 45% by weight of triacylglycerols. In the case of krill oil, the amount of triacylglycerols is about 40% by weight.

In some embodiments, the phospholipid-containing oil comprises about 0.5% to about 2% by weight of diacylglycerols. For example, the phospholipid-containing oil may comprise about 0.8% to about 1.5% by weight of diacylglycerols. In the case of krill oil, the amount of diacylglycerols is about 1.2% by weight.

In some embodiments, the phospholipid-containing oil comprises up to about 2% by weight of monoacylglycerols. For example, the phospholipid-containing oil may comprise up to about 1% by weight of monoacylglycerols. In the case of krill oil, the amount of monoacylglycerols is less than 1% by weight.

The phospholipid-containing oil may be natural or synthetic. Synthetic phospholipid containing oils may be prepared by mixing triacylglycerols oils with phospholipid rich oils or pure phospholipids or by enzymatic synthesis. Suitable phospholipids include egg yolk phospholipids, soy phospholipids and lecithins.

In particularly preferred embodiments, the phospholipid-containing oil is krill oil.

The oil-in-water pre-emulsion may comprise as much phospholipid-containing oil as possible while enabling it to remain an oil-in-water pre-emulsion. In some embodiments, the oil-in-water pre-emulsion comprises up to about 60% by weight phospholipid-containing oil. For example, up to about 50% phospholipid-containing oil, or up to about 40% phospholipid-containing oil, or up to about 30% phospholipid-containing oil, or up to about 20% phospholipid-containing oil. In one preferred embodiment, the oil-in-water pre-emulsion comprises about 20% phospholipid-containing oil. In another preferred embodiment, the oil-in-water pre-emulsion comprises about 10% phospholipid-containing oil.

The oil-in-water pre-emulsion suitably comprises at least 10% phospholipid-containing oil, preferably greater than 10% phospholipid-containing oil, such as at least 11%, at least 12%, at least 13%, at least 14% or at least 15% phospholipid oil. The amount may be even higher, such as at least 20%, at least 25%, at least 30%, at least 35% or at least 40% phospholipid-containing oil.

In some embodiments, the oil-in-water pre-emulsion has a phospholipid interface.

Encapsulant Material

The method of the present invention involves mixing the above oil-in-water pre-emulsion with an encapsulant material. The method of the present invention involves embedding the above oil-in-water pre-emulsion in an encapsulant material. The encapsulant material acts to stabilise the omega-3 fatty acids in the oil against oxidation and masks any undesirable flavour or aroma from the phospholipid-containing oil.

The term encapsulant material refers to any material which can be used to encapsulate an oil-in-water pre-emulsion comprising a phospholipid-containing oil.

In one embodiment, the encapsulant material comprises a protein, a carbohydrate, or a protein and a carbohydrate.

In one embodiment, the encapsulant material is buttermilk.

In another embodiment, the encapsulant material consists of a protein, carbohydrate, a blend of protein and carbohydrate or a Maillard reaction product.

In some embodiments, the encapsulant material comprises additives such as lipids (neutral and polar), flavours, antioxidants, nutrients, bioactives and therapeutics.

In some embodiments, the encapsulant material is in aqueous solution. Using an aqueous solution of an encapsulant material enhances the aqueous solubility of the encapsulated phospholipid oil-in-water emulsion resulting from the method of the present invention. This in turn has the advantage that the encapsulated phospholipid oil-in-water emulsion can be incorporated into aqueous based food products, for example, yoghurt and protein based beverages.

When the encapsulant material is in aqueous solution, the aqueous solution comprises about 1% to about 80% by weight of encapsulant material(s). For example, the aqueous solution may comprise about 1% to about 50% by weight of encapsulant material(s), or about 1% to about 30% by weight of encapsulant material(s), or about 1% to about 20% by weight of encapsulant material(s), or about 2% to about 10% by weight encapsulant material(s).

In some embodiments, the aqueous solution may comprise up to about 1% by weight of encapsulant material(s). For example, the aqueous solution may comprise up to about 2% by weight of encapsulant material(s), or up to about 5% by weight of encapsulant material(s), or up to about 10% by weight of encapsulant material(s), or up to about 20% by weight of encapsulant material(s), or up to about 30% by weight of encapsulant material(s), or up to about 50% by weight of encapsulant material(s), or up to about 80% by weight of encapsulant material(s). In some embodiments, the amount of encapsulant material(s) in the aqueous solution may be at about or between (by weight) any of the following amounts: 1%, 5%, 10%, 20%, 30%, 40%, 50%, 60%, 70%, 80%.

Protein

When the encapsulant material comprises a protein, the protein may be any protein, synthetic or natural, which is capable of encapsulating an oil-in-water pre-emulsion comprising a phospholipid-containing oil. The protein may also be a hydrolysed protein. The protein is preferably soluble in aqueous solution, for example water, and in one embodiment, the encapsulant material is in an aqueous solution. In other embodiments, the protein can be added as a dry powder or made into a paste or dough for extrusion and drying.

In one embodiment, the protein is selected from the group consisting of milk protein, soy protein, legume protein, cereal protein, meat protein and egg protein, and combinations thereof.

When the protein is a milk protein, the milk protein may be selected from the group consisting of casein and whey protein, and combinations thereof. Where the milk protein is a whey protein, the whey protein may be selected from the group consisting of whey protein isolate, whey protein concentrate and whey protein hydrolysate, and combinations thereof.

When the protein is a soy protein, the soy protein may be selected from the group consisting of soy protein isolate, soy protein concentrate, soy protein hydrolysate and soy flour, and combinations thereof.

When the protein is a legume protein, the legume protein may be selected from the group consisting of pea protein, chickpea protein and lentil protein, and combinations thereof.

When the protein is a cereal protein, the cereal protein may be derived from a cereal selected from the group consisting of rye, barley, oats, maize, rice, spelt, millet, sorghum and wheat, and combinations thereof.

When the protein is an animal protein, the animal protein may be selected from the group consisting of sarcoplasmic protein, myofibrillar protein, collagen, gelatin and elastin, and combinations thereof. When the meat protein is a myofibrillar protein, the myofibrillar protein may be selected from the group consisting of myosin and actin, and combinations thereof.

When the protein is an egg protein, the egg protein may be selected from the group consisting of albumin, mucoprotein and globulin, and combinations thereof.

In one embodiment, the protein is gelatin, such as fish gelatin. In another embodiment, the protein is a milk protein selected from the group consisting of casein and whey protein, and combinations thereof.

Carbohydrate

When the encapsulant material comprises or consists of a carbohydrate, the carbohydrate may be any carbohydrate, synthetic or natural, which is capable of encapsulating an oil-in-water pre-emulsion comprising a phospholipid-containing oil. The carbohydrate is preferably soluble or dispersible in aqueous solution, for example water, and in one embodiment, the encapsulant material is in an aqueous solution. In other embodiments, the carbohydrate can be added as a dry powder or made into a paste or dough for extrusion and drying.

In one embodiment, the carbohydrate is a sugar containing a reducing group. Suitable reducing groups include aldehydes, ketones, hemiacetals and ketoses, and combinations thereof.

In one embodiment, the carbohydrate is selected from the group consisting of monosaccharides, disaccharides, trisaccharides, oligosaccharides and polysaccharides, and combinations thereof.

When the carbohydrate is a monosaccharide, the monosaccharide may be selected from the group consisting of glucose, fructose, galactose, mannose, xylose, fucose, galactosamine, glucosamine, mannosamine, and ribose, and combinations thereof. In a preferred embodiment, the monosaccharide is glucose.

When the carbohydrate is a disaccharide, the disaccharide may comprise any combination of the above monosacchrides. For example, the disaccharide may be selected from the group consisting of sucrose, lactose, maltose, trehalose, lactulose, kojibiose, nigerose, isomaltose, sophorose, laminaribiose, gentisbiose, cellobiose, turanose, maltulose, palatinose, gentiobiulose, mannobiose, melibiose, melibiulose, rutinose, rutinulose and xylobiose, and combinations thereof.

When the carbohydrate is a trisaccharide, the trisaccharide may comprise any combination of the above monosacchrides and/or disaccharides. For example, the trisaccharide may be selected from the group consisting of isomaltotriose, nigerotriose, maltotriose, melezitose, raffinose and kestose, and combinations thereof.

When the carbohydrate is an oligosaccharide, the oligosaccharide may comprise any combination of the above monosaccharides, disaccharides and/or trisaccharides. For example, the oligosaccharide may be selected from the group consisting of fructooligosaccharide, galactooligosaccharides, mannan oligosaccharides and maltodextrin, and combinations thereof.

Where the carbohydrate is a polysaccharide, the polysaccharide may comprise any combination of the above monosaccharides, disaccharides, trisaccharides and/or oligosaccharides. The polysaccharide may be a starch, a gum, or a fibre, cellulose, beta-glucan, polydextrose or a combination thereof.

Protein-Carbohydrate Blends and Maillard Reaction Products

In one embodiment, the encapsulant material comprises a protein and a carbohydrate. The protein and carbohydrate may be present separately in the encapsulant material, as a physical blend, or they may have at least partially reacted to form a reaction product. In some embodiments, the protein and carbohydrate have at least partially reacted to form a Maillard reaction product.

In some embodiments, the encapsulant material consists of a Maillard reaction product.

Maillard reaction products can exhibit anti-oxidation properties in the presence of fatty acids and therefore use of an encapsulant material comprising or consisting of a Maillard reaction product in the method of the invention is advantageous because it may reduce oxidation of the fatty acids in the phospholipid-containing oil.

In one embodiment, the protein and carbohydrate may have at least partially reacted to form a Maillard reaction product such that the encapsulant material comprises at least about 10% of a Maillard reaction product. For example, the encapsulant material may comprise at least about 20% of a Maillard reaction product, or at least about 40% of a Maillard reaction product, or at least about 60% of a Maillard reaction product.

The Maillard reaction is a reaction that occurs between free amine groups of amino acids in a protein and reducing sugar groups of a carbohydrate. The Maillard reaction typically occurs in the non-enzymatic browning of foods. The Maillard reaction generally occurs during heating of foods and therefore in one embodiment, the protein and carbohydrate are heated to form a Maillard reaction product.

To form a Maillard reaction product, the protein and carbohydrate may be heated to at least about 60° C., for example at least about 80° C., or at least about 100° C., or at least about 120° C., or at least about 140° C., or at least about 160° C. To form a Maillard reaction product, the protein and carbohydrate may be heated to up to about 160° C., or up to about 140° C., or up to about 120° C., or up to about 100° C., or up to about 80° C. To form a Maillard reaction product, the protein and carbohydrate may be heated to about 60° C. to about 160° C., or about 80° C. to about 140° C., or about 100° C. to about 120° C. In a preferred embodiment, the protein and carbohydrate are heated to up about 60° C. to about 160° C. to at least partially form a Maillard reaction product.

In one embodiment, the protein and carbohydrate are heated to at least partially form a Maillard reaction product before mixing with the oil-in-water pre-emulsion. For example, the protein and carbohydrate are heated to at least partially form a Maillard reaction product and then the mixture containing the Maillard reaction product (and optionally residual protein and carbohydrate) is mixed with the oil-in-water pre-emulsion comprising a phospholipid-containing oil.

In an alternative embodiment, the protein and carbohydrate are heated to at least partially form a Maillard reaction product after mixing with the oil-in-water pre-emulsion. For example, the protein and carbohydrate are mixed with the oil-in-water pre-emulsion comprising a phospholipid-containing oil and then the resulting mixture is heated to such that the protein and carbohydrate at least partially react to for a Maillard reaction product.

Additives

In some embodiments, the encapsulant material comprises additives. Any additive which is desired to be incorporated into the encapsulant material can be used. Examples of suitable additives include lipids (neutral and polar), flavours, nutrients, bioactives and therapeutics.

When the additive is a lipid, the lipid may be selected from the group consisting of milk fat, animal fat, vegetable oils and medium chain triacylglycerols.

When the additive is a flavour, the flavour may be selected from the group consisting of aldehydes, ketones, terpenes and alcohols for example essential oils and flavour extracts.

When the additive is a nutrient, the nutrient may be selected from the group consisting of vitamins, minerals and micronutrients.

When the additive is an antioxidant, the antioxidant may be selected from the group consisting of oil soluble and water soluble antioxidants.

When the additive is a bioactive, the bioactive may be selected from the group consisting of polyphenols, probiotics, vitamins, minerals and micronutrients.

When the additive is a therapeutic, the therapeutic may be any therapeutic drug known in the art.

Mixing

In some embodiments, the oil-in-water pre-emulsion is added to the encapsulant material or the aqueous solution comprising the encapsulant material before mixing. In other embodiments, the encapsulant material or the aqueous solution comprising the encapsulant material is added to the oil-in-water pre-emulsion before mixing.

In some embodiments, the oil-in-water pre-emulsion is added to the encapsulant material or the aqueous solution comprising the encapsulant material before mixing and then a further encapsulant material or aqueous solution comprising the encapsulant material is added and the mixture is mixed again. In other embodiments, the encapsulant material or the aqueous solution comprising the encapsulant material is added to the oil-in-water pre-emulsion before mixing and then a further encapsulant material or aqueous solution comprising the encapsulant material is added and the mixture is mixed again.

In some embodiments, the encapsulant material or aqueous solution comprising the encapsulant material is heated before it is mixed with the oil-in-water pre-emulsion. In one embodiment, the encapsulant material or aqueous solution comprising the encapsulant material is heated to at least about 60° C. before mixing with the oil-in-water pre-emulsion. For example, the encapsulant material or aqueous solution comprising the encapsulant material may be heated to at least about 70° C., or at least about 80° C., or at least about 90° C. before mixing with the oil-in-water pre-emulsion.

The oil-in-water pre-emulsion and encapsulant material may be mixed by homogenisation. The oil-in-water pre-emulsion and encapsulant material may be homogenised or the oil-in-water pre-emulsion and encapsulant material may be mixed until homogeneous using any mixer known in the art. In one preferred embodiment, the homogenisation is by high shear mixing. The homogenisation may be high-pressure or low-pressure homogenisation. Any homogenisation pressure used in the art to homogenise an emulsion without aggregation may be used in the method of the present invention. For example, the homogenisation pressure may be up to about 1000 bar, or up to about 500 bar, or up to about 200 bar. In some embodiments, the oil-in-water pre-emulsion and encapsulant material are homogenised at a temperature of at least about 20° C.

Encapsulated Phospholipid Oil-In-Water Emulsion

The method of the present invention involves mixing an oil-in-water pre-emulsion comprising a phospholipid-containing oil with an encapsulant material to produce an encapsulated phospholipid oil-in-water emulsion. The method of the present invention produces an oil-in-water pre-emulsion comprising a phospholipid containing oil embedded in an encapsulant material. As used herein, the term encapsulated or the term embedded means that the oil-in-water pre-emulsion comprising the phospholipid containing oil is substantially surrounded by the encapsulant material.

In some embodiments, it is necessary to adjust the pH of the encapsulated phospholipid oil-in-water emulsion. The optimum pH for the encapsulated phospholipid oil-in-water emulsion is the pH at which the encapsulated phospholipid oil-in-water emulsion is most stable. In one embodiment, the pH of the encapsulated phospholipid oil-in-water emulsion is adjusted to about 4 to about 10. For example, the pH may be adjusted to about 5 to about 9, or to about 6 to about 8 or to about 7. Preferably, the pH is adjusted to about 6 to about 8. For example, the pH may be adjusted to about pH 6, or about pH 7 or about pH 8.

Adjustment of the pH may be undertaken by any method known in the art.

The encapsulated phospholipid oil-in-water emulsion preferably has a particle size (before or after adjustment of the pH) of about 100 nanometres to about 3 microns. For example, the encapsulated phospholipid oil-in-water emulsion may have a particle size of about 300 nanometres to about 2 microns, or about 500 nanometres to about 1 micron. In some embodiments, the encapsulated phospholipid oil-in-water emulsion has a particle size of less than about 2 micron. For example, the encapsulated phospholipid oil-in-water emulsion may have a particle size of less than about 1 micron, or less than about 500 nanometres, or less than about 300 nanometres.

The amount of phospholipid-containing oil present in the encapsulated phospholipid oil-in-water emulsion depends on how much phospholipid-containing oil was present in the oil-in-water pre-emulsion. However, preferably, the encapsulated phospholipid oil-in-water emulsion comprises up to about 60% by weight of phospholipid-containing oil. For example, the encapsulated phospholipid oil-in-water emulsion may comprise up to about 50% of phospholipid-containing oil, or up to about 40% of phospholipid-containing oil, or up to about 30% of phospholipid-containing oil, or up to about 20% of phospholipid-containing oil.

It can be difficult to achieve levels of 10% or more phospholipid-containing oils into oil delivery materials while avoiding the taste associated with the neat oil. According to the present application, it has been possible to introduce relatively high levels of oil into the encapsulated phospholipid oil-in-water emulsion product. The amount of phospholipid-containing oil present in the encapsulated phospholipid oil-in-water emulsion may be at least 10% phospholipid-containing oil, preferably greater than 10% phospholipid-containing oil, such as at least 11%, at least 12%, at least 13%, at least 14% or at least 15% phospholipid oil.

It has been found by the applicant that higher levels of oil can be incorporated into the encapsulated phospholipid oil-in-water emulsion product in particular when the product is manufactured as an extruded product and/or expanded food product. This level of incorporation of phospholipid-containing oil is higher than could have been anticipated from the spray-dried variants, which typically incorporate less oil. The amount of phospholipid-containing oil in the extruded and/or expanded food product may be at least 2%, at least 4%, at least 6%, at least 8%, at least 10%, greater than 10%, at least 11%, at least 12%, at least 13%, at least 14%, at least 15%, at least 16%, at least 17%, at least 18%, at least 19% or at least 20% phospholipid oil.

Further Processing Steps

Once the encapsulated phospholipid oil-in-water emulsion has been formed by the method of the invention, there are a number of optional additional processing steps which may be undertaken. These additional processing steps have the advantage of allowing the encapsulated phospholipid oil-in-water emulsion to be provided in formats other than as an emulsion. These formats may enable the delivery of phospholipid-containing oils into a wider range of functional foods and beverages than previously possible.

In some embodiments, the encapsulated phospholipid oil-in-water emulsion may be dried to form a powder. In one embodiment, the encapsulated phospholipid oil-in-water emulsion may be spray dried to form a powder. The spray drying may be undertaken using any suitable method in the art. Other forms of drying can be used to dry the encapsulated phospholipid oil-in-water emulsion, including freeze drying, drum drying and foam mat drying.

In some embodiments, the encapsulated phospholipid oil-in-water emulsion may be extruded. In one embodiment, the encapsulated phospholipid oil-in-water emulsion is extruded into pellets. The encapsulated phospholipid oil-in-water emulsion pellets may then be dried. The extruded product may also be an expanded, extruded product.

In some embodiments, the ingredient(s) selected as encapsulant material for extrusion is added slowly into the phospholipid oil-in water pre-emulsion while mixing using a dough mixer or high shear mixer. Extra water may be added as required to achieve the desired phospholipid oil payload and dough consistency suitable for extrusion. In one embodiment, the encapsulated phospholipid oil-in-water emulsion is extruded into pellets. In one embodiment the encapsulated phospholipid oil extruded into pellets may then be dried in a fluid bed dryer or in an oven dryer.

In some embodiments an additional coating is applied for extra protection to the encapsulated phospholipid oil powder, pellets or beadlets for controlled release. In one embodiment the coating may be a high melting fat, lipids, or any film forming polysaccharides, proteins, carbohydrates or combinations thereof.

In some embodiments, the encapsulated phospholipid oil-in-water emulsion may be provided as an intermediate moisture product (for example a gel, paste, or dough) without further drying the gel, paste, dough or pellet. For example gels and paste can be made using gelling materials known in the art in combination with processing conditions known in the art during mixing of the pre-emulsion or the encapsulated phospholipid oil emulsion and the encapsulant materials.

In some embodiments, the encapsulated phospholipid oil-in-water emulsion may be subjected to sterilisation before it can be consumed, incorporated into food products or processed further. The sterilisation may be undertaken using any method known in the art. As one example, the sterilisation may be by pasteurisation. In some embodiments, the pasteurisation may be ultra high temperature (UHT) processing. In some embodiments, the sterilisation is undertaken after the encapsulated phospholipid oil-in-water emulsion has been further processed.

When the encapsulated phospholipid oil-in-water emulsion has been processed by drying, for example into a powder or pellet, a secondary coating may be applied. Any suitable secondary coating may be used, for example, proteins, gums, waxes, shellac, fatty acids or high melting fats.

When the encapsulated phospholipid oil-in-water emulsion has been processed by drying, for example into a powder or pellet, the phospholipid oil-in-water emulsion is encapsulated in a matrix comprising or consisting of the encapsulant material. Where the matrix comprises the encapsulant material, the matrix may also comprise additives, for example, lipids (neutral or polar), flavours, nutrients, antioxidants, bioactives and therapeutics.

The present application provides a food product comprising an encapsulated phospholipid oil-in-water emulsion, said emulsion comprising an oil-in-water pre-emulsion comprising a phospholipid-containing oil, wherein the oil-in-water pre-emulsion is encapsulated or embedded in an encapsulant material.

The present application further provides a spray dried powder of an encapsulated phospholipid oil-in-water emulsion, said emulsion comprising an oil-in-water pre-emulsion comprising a phospholipid-containing oil, wherein the oil-in-water pre-emulsion is encapsulated or embedded in an encapsulant material.

The present application further provides an extruded food product comprising an encapsulated phospholipid oil-in-water emulsion, said emulsion comprising an oil-in-water pre-emulsion comprising a phospholipid-containing oil, wherein the oil-in-water pre-emulsion is encapsulated or embedded in an encapsulant material. According to some embodiments, the extruded food product comprises more than 10% phospholipid-containing oil. According to some embodiments, the extruded food product consists of the encapsulated phospholipid oil-in-water emulsion.

The product of the present application may be reconstituted in water. The reconstituted product may be used as an ingredient or component of a food product. The present application further provides an encapsulated phospholipid oil-in-water emulsion as described above, or a spray dried product as described above, reconstituted in water.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention will now be described with reference to the following non-limiting Examples.

EXAMPLES

Example 1

Preparation of Krill Oil (KO)-in-Water Pre-Emulsion

KO-in-water pre-emulsions (20% w/w) were prepared by adding deionised water (60° C.) to KO pre-heated to 60° C. The KO-water mixture was blended using an overhead mixer (Heidolph R2R 2051) in a water bath maintained at 60° C. for 7 min at 1650 rpm. The pH of KO-in-water pre-emulsion was 8.5. The KO-in-water pre-emulsion was further homogenised with a high shear mixer (Silverson L4R) at speed 7000 rpm for 15 min. The particle size d(0.5) of the 20% KO pre-emulsion after mixing with overhead mixer was 7.23 μm, after mixing with a high shear mixer the particle size was reduced to 0.13 μm In another example the KO-in-water pre-emulsion was prepared as above with extra water added to make 10% KO-in-water pre-emulsion, and the pH of the KO-in-water pre-emulsion was adjusted to 6.0 or 8.0 using 1M hydrochloride acid HCl or 0.1M NaOH before homogenization with a high shear mixer (Silverson L4R) at speed 7000 rpm for 15 min. The particle size d(0.5) of the 10% KO pre-emulsion adjusted to pH 6.0 was 0.19 μm, and the KO pre-emulsion adjusted to pH 8.0 was 0.12 μm.

Figure 4:
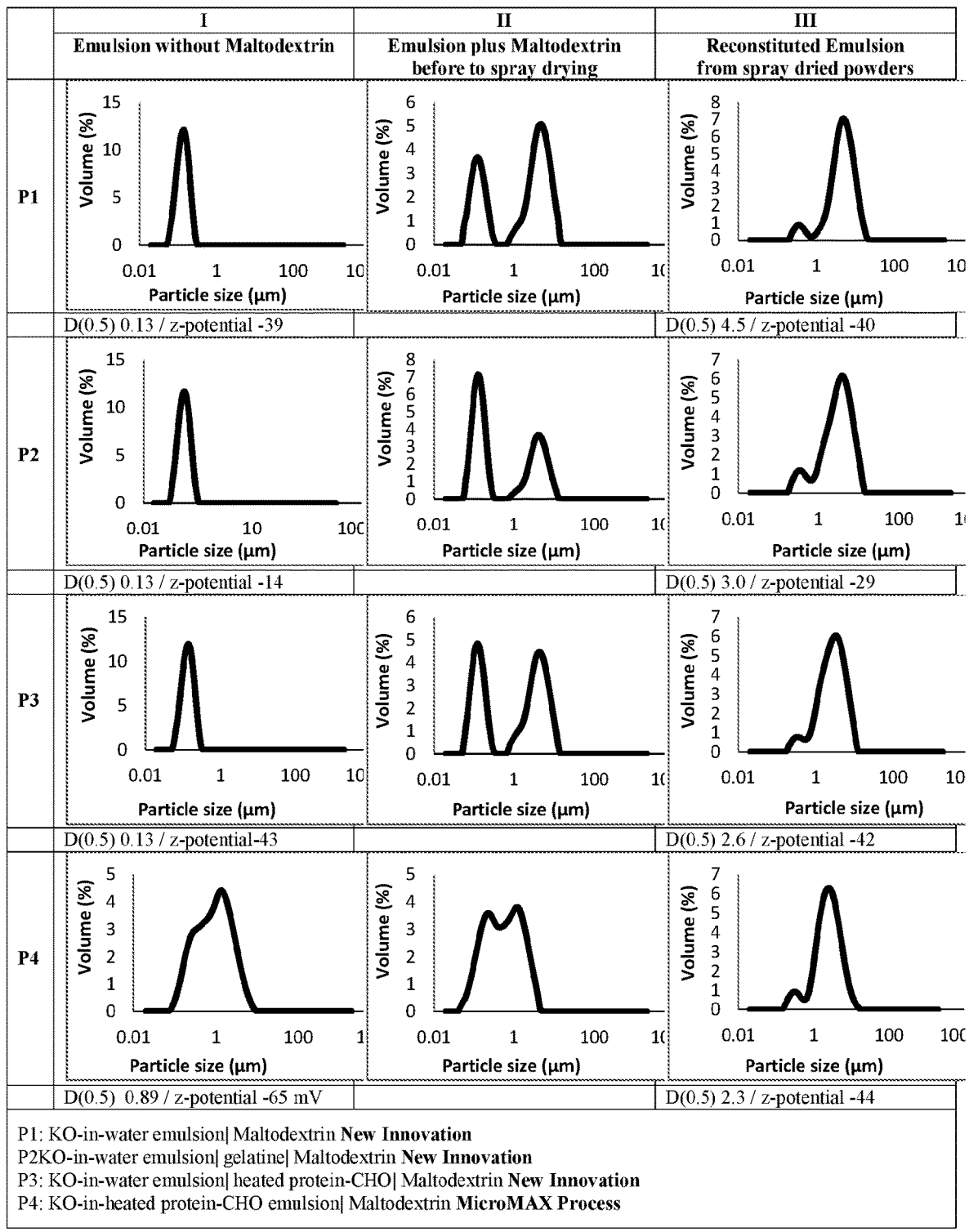
FIG. 4 is a series of graphs showing the particle size distribution, of krill oil-in-water pre-emulsions, including: (column I) without maltodextrin with d(0.5) and zeta potential, (column II) with maltodextrin as drying aid, and (column III) reconstituted emulsion from spray dried powders with d(0.5) and zeta potential.

In another example the KO-in-water pre-emulsion prepared as above was homogenized using a high pressure homogenizer (Avestin C3) at 120/80 bar, 240/80 bar, 300/80 bar, 350/100 bar pressures in two stage homogenisation. The particle size d(0.5) of the 10% KO pre-emulsion prepared using a high pressure homogeniser were 0.83, 0.19, 0.14 and 0.14 μm respectively All the KO-in-water pre-emulsions prepared as above were physically stable during storage. The particle size distribution of the 10% KO-in-water pre-emulsion (pH 8) is shown in FIG. 4, sample 1.

Example 2

Preparation of Encapsulated Krill Oil (KO) Emulsions

Figure 3:
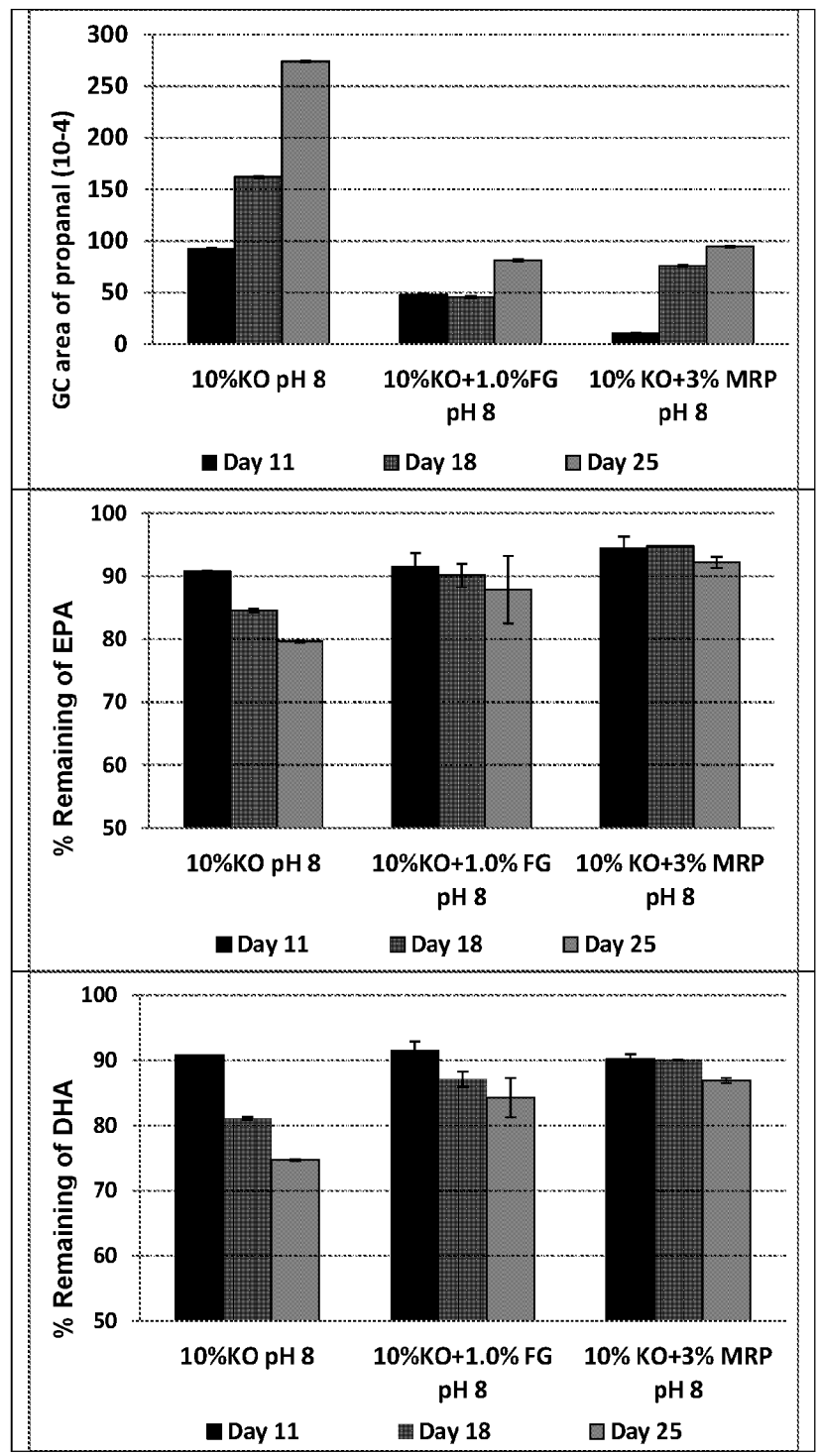
FIG. 3 is a series of graphs showing (A) headspace analysis of propanal; (B) the remaining percentage of eicosapentaenoic acid (EPA); and (C) remaining percentage of docosahexaenoic acid (DHA); in krill oil-in-water pre-emulsion (10% krill oil) and encapsulated krill oil-in-water emulsions (10% krill oil+1% FG and 10% krill oil+3% MRP) subjected to an accelerated oxidation at 40° C.

A fish gelatin (FG) solution (10% w/w) was prepared by adding FG powder into deionised water heated up to 60° C. The mixture was stirred using a magnetic stirrer until FG was completely dissolved in the water. The FG solution had a pH of 5.4 at 22° C. The FG solution at 60° C. was added into the 20% KO-in-water pre-emulsion prepared as in Example 1 above, while mixing using an overhead mixer for 10 minutes at 1000 rpm. The pH of the mixture was adjusted to pH 6 and pH 8 at room temperature using 0.1M HCl or 0.1M NaOH water solutions. The particle size d(0.5) of the encapsulated KO emulsion (10% KO+1% FG) was 0.33 μm at pH 6 and 0.12 μm at pH 8. The stability of the encapsulated KO emulsion (10% KO+1% FG, pH 8) over 25 days under accelerated storage condition is shown in FIG. 3.

In another example the FG in the final emulsion was increased to 2.5%. The particle size d(0.5) of the encapsulated KO emulsion (10% KO+2.5% FG) was 1.24 μm at pH 6 and 0.13 μm at pH 8.

Figure 2:
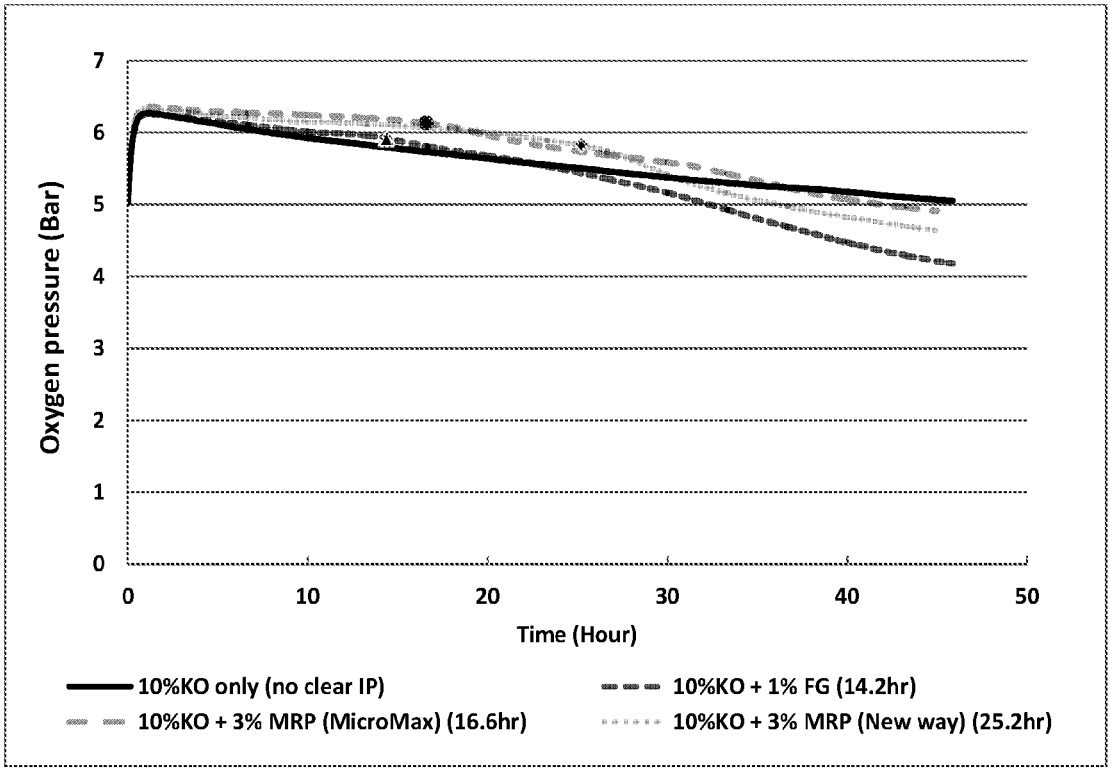
FIG. 2 is a graph showing the induction period for oxidation of krill oil-in-water emulsions under accelerated conditions at 80° C., 5 bar oxygen pressure, prepared in different ways (1) 10% krill oil (pre-emulsion), (2) 10% krill oil (pre-emulsion)+1% fish gelatine (FG) (3) 10% krill oil (pre-emulsion)+3% heated protein-carbohydrate (Maillard reaction products, MRP) compared to the conventional method of emulsion preparation (4) homogenised mixture of 10% neat krill oil+3% MRP.

In another example the pH of the encapsulated KO emulsion was not adjusted (natural pH 8). The particle size d(0.5) of the encapsulated KO emulsion (10% KO+1% FG, pH 8) was 0.13 μm. The typical particle size distribution of the 10% KO-in-water pre emulsion is shown in FIG. 4, sample 2. The induction period of the sample under accelerated oxidation at 80° C., 5 bar oxygen pressure was 14.2 hrs (FIG. 2, sample 2).

In another example, a protein-carbohydrate solution (20% total solids) was prepared. The pH of the mixture was adjusted to 7.5 and heated to minimum 90° C. for 30 minutes to produce some Maillard reaction products and then cooled down to 60° C. The heated protein-carbohydrate encapsulant was added into the KO-in-water pre-emulsion prepared as in Example 1 above, while mixing using an overhead mixer for 10 minutes at 1000 rpm. The pH of the mixture was 8 at room temperature. The particle size d(0.5) of the encapsulated KO emulsion (10% KO+3% MRP, pH 8) was 0.13 μm. Stability of encapsulated KO emulsion (10% KO+3% MRP, pH 8) over 25 days under accelerated storage condition is shown in FIG. 3.

In another example, the pH of the encapsulated KO emulsion was not adjusted (natural pH 8). The particle size d(0.5) of the encapsulated KO emulsion (10% KO+3% MRP, pH 8) was 0.13 μm. The typical particle size distribution of the 10% KO-in-water pre emulsion is shown in FIG. 4, sample 3. The induction period of the sample under accelerated oxidation at 80° C., 5 bar oxygen pressure was 25.2 hrs (FIG. 2, sample 3).

Example 3

Preparation of Spray Dried Powders of Krill Oil Embedded in a Matrix (P1) A maltodextrin (MD) solution (50% w/w) was prepared by adding MD powder into water heated up to 60° C. The mixture was stirred using an overhead mixer until MD was completely dissolved in the DI water. The MD solution at 60° C. and extra water was added (to achieve 22% total solids in the final emulsion) into the KO-in-water pre-emulsion prepared as in Example 1 above, while mixing using a high shear mixer (Silverson) for 10 minutes. The pH of the final emulsion before drying was 8.0. The final emulsion was spray dried into a powder containing 50% KO, 50% MD (dry basis).

(P2) In another example a fish gelatin (FG) solution (5% w/w) was prepared by adding FG powder into deionised water heated up to 60° C. The mixture was stirred using an overhead mixer until the FG was completely dissolved in the water. The FG solution had a pH of 5.4 at 22° C. The FG solution at 60° C. was added into the KO-in-water pre-emulsion prepared as in Example 1 above, while mixing using a high shear mixer for 10 minutes. An MD solution (50% w/w) and extra water was added (to achieve 22% total solids in the final emulsion) to the KO+FG while mixing using a high shear mixer for another 10 minutes. The pH of the final emulsion before drying was 7.8. The final formulation was spray dried into a powder containing 50% KO, 5% FG, 45% MD (dry basis).

(P3) In another example, a protein-carbohydrate solution (20% total solids) was prepared. The pH of the mixture was adjusted to 7.5 and heated to 100° C., 50 minutes (in a retort) to produce some Maillard reaction products (MRP) and then cooled down to 60° C. and adjusted to 15% total solids by adding extra water at 60° C. The heated protein-carbohydrate encapsulant was added into the KO-in-water pre-emulsion prepared as in Example 1 above, while mixing using a high shear mixer for 10 minutes. An MD solution (50% w/w) and extra water was added (to achieve 22% total solids in the final emulsion) to the KO+protein-carbohydrate (MRP) mixture using a high shear mixer for another 10 minutes. The pH of the final emulsion before drying was 7.7. The final formulation was spray dried into a powder containing 50% KO, 15% protein-carbohydrate (MRP), 35% MD (dry basis).

(P4) In another example (using prior art for comparison), a protein-carbohydrate solution (20% total solids) was prepared. The pH of the mixture was adjusted to 7.5 and heated to minimum 90° C. for 30 minutes to produce some Maillard reaction products and then cooled down to 60° C. and adjusted to 15% total solids by adding extra water at 60° C. An MD solution (50% TS) and extra water was added (to achieve 22% total solids in the final emulsion) and mixed until homogeneous. Neat KO (60° C.) was added into the heated protein-carbohydrate mixture (60° C.) using a high shear mixer for 5 minutes, then subsequently homogenised (MG homogeniser) at 350/100 bar pressures to form the primary emulsion. The pH of the final emulsion before drying was 7.8. The final formulation was spray dried into a powder containing 50% KO, 15% protein-carbohydrate (MRP), 35% MD (dry basis).

Table 1 shows the zeta potential of the emulsions without maltodextrin and the reconstituted powder from spray dried encapsulated product prepared according to examples P1, P2 and P3. Reconstitution refers to water reconstitution, and in particular to mixing the spray dried encapsulated product in water. Prior to drying, the zeta potential of the neat krill oil-in-water pre-emulsion (P1) and that prepared according to process (P3) were similar, suggesting that the interface of the oil droplet were stabilised by phospholipids in both these samples. This is different to that prepared by the conventional process (P4) where neat kill oil is emulsified directly into the aqueous phase containing heated protein-carbohydrate. The difference between the zeta potential of the neat krill oil-in-water pre-emulsion (P1) and the emulsion encapsulated in gelatine (P2) is due to the electrostatic deposition of the fish gelatine onto the primary phospholipid interface of the krill oil droplet. Conversion of these emulsions prepared in different ways, all resulted in powders, which on reconstitution in water, were very similar in terms of the particle size and the zeta potential.

TABLE 1

Zeta-Potentials of emulsions without maltodextrin and reconstituted powder emulsions with maltodextrin, at pH 6.0

| Sample | Formulation | Emulsion prepared before maltodextrin addition | Reconstituted emulsion from Krill oil powders with maltodextrin |
|---|---|---|---|
| P1 | KO-in-water pre-emulsion\| Maltodextrin | −39 ± 2 | −39.6 ± 0.6 |
| P2 | KO-in-water pre-emulsion\| gelatine\| Maltodextrin | −14 ± 1 | −29 ± 1 |
| P3 | KO-in-water pre-emulsion\| heated protein-CHO\| Maltodextrin | −42.7 ± 2.5 | −42 ± 2 |
| P4 | KO-in-heated protein-CHO emulsion\| Maltodextrin (Conventional process) | −65.3 ± 0.6 | −44.4 ± 1.5 |

Example 4

Preparation of Microencapsulated Krill Oil Embedded in a Matrix of a Protein, a Carbohydrate, a Protein-Carbohydrate Blend or a Heated Protein-Carbohydrate Mixture by Extrusion Dry and liquid feeds were introduced into the extruder barrel. Two liquid feed were prepared for extrusion: (a) Prepare the 25% krill oil-in water pre-emulsion (KOE1) or (b) 10% krill oil-in-heated protein carbohydrate emulsion with 20% total solids (KOE2) and used as the liquid feed to the extruder. Different dry feed formulations were used as the encapsulant matrix or embedding matrix for extrusion, with or without additives. The liquid feed was added via peristaltic pump while the dry feed was slowly added via a hopper. The dry feed rate and the liquid feed rate was controlled to get a desired dough consistency inside the barrel.

In one embodiment for preparation of extruded noodles (non-expanded extrudates), the extruder temperature profile was 90; 100; 100; 70° C., and screw speed is 250 rpm. The extrudate was collected and analysed for moisture content, oil content and DHA/EPA ratio. See Table 2 for the results of analysis from examples 4.1, 4.2, 4.3, 4.4, 4.5, 4.6. Optionally additional coating is applied for extra protection or controlled release of the oil from the extrudate. The preservation of the DHA:EPA ratios in the extruded products suggests the matrices used protects the krill oil during high temperature—high shear extrusion conditions.

TABLE 2

Extruded Noodles containing Krill Oil [Non-expanded Extrudates]

| Example | KO emulsion embedded in different matrices | Moisture Content (%) | Oil Content (% dry basis) | Ratio of DHA/EPA |
|---|---|---|---|---|
| 4.1 | KOE1 (protein-CHO blend matrix) | 20.62 | 8.82 | 0.51 |
| 4.2 | KOE1 (heated protein-CHO matrix) | 19.43 | 14.14 | 0.52 |
| 4.3 | KOE1 (protein only matrix) | 24.32 | 15.16 | 0.52 |
| 4.4 | KOE1 (carbohydrate only matrix) | 8.85 | 11.88 | 0.50 |
| 4.5 | KOE1 (carbohydrate matrix + polyphenol) | 12.82 | 9.73 | 0.50 |
| 4.6 | KOE2 (carbohydrate matrix) | 12.31 | 7.10 | 0.50 |

Liquid feed:
KOE1 = 25% krill oil in water emulsion (neat krill oil emulsion)
KOE2 = 10% krill oil-in-protein carbohydrate emulsion (20% total solids)
KO - Neat krill oil used for preparation of emulsions KOE1 and KOE2 had an DHA/EPA ratio of 0.50
Dry Feed:
4.1 = 1Na caseinate:1 modified starch (Capsul):1 glucose
4.2 = Heated (2Na caseinate:1glucose:1 dried glucose syrup)
4.3 = Nacaseinate only
4.4 = 90(1modified starch (Capsul):1potato starch):10 sugar
4.5 = 90(1modified starch (Capsul):1potato starch):10 sugar (with 0.1% polyphenol, epigallocatechin gallate)
4.6 = 90(1modified starch (Capsul):1potato starch):10 sugar Example 5

Preparation of Microencapsulated Krill Oil Embedded in an Expanded Snack Formulation Two liquid feed were prepared for extrusion: (a) Prepare the 25% krill oil-in water pre-emulsion (KOE1) or (b) 10% krill oil-in-heated protein carbohydrate emulsion with 20% total solids (KOE2) and used as the liquid feed to the extruder. The liquid feed was added via peristaltic pump while the dry ingredients (optionally with additives) for the snack formulation was dry blended and slowly added via a hopper. The dry feed rate and the liquid feed rate was controlled to get a reasonable dough consistency inside the barrel. In one embodiment, the extruder temperature profile was 90; 100; 120; 140° C., and screw speed is 348 rpm. The expanded extrudate was collected and dried in an oven for 5 h at 50° C., and analysed for moisture content, oil content and DHA/EPA ratio. See Table 3 for the results of analysis from examples 5.1, 5.2, 5.3. Optionally additional coating is applied containing some flavouring or additives to enhance the sensory properties of the final product. The preservation of the DHA:EPA ratios in the extruded products suggests the matrices used protects the krill oil during high temperature—high shear extrusion conditions.

TABLE 3

Extruded Expanded Snacks containing Krill Oil

| Example | KO emulsion embedded in different matrices | Moisture Content (%) | Oil Content (% dry basis) | Ratio of DHA/EPA |
|---|---|---|---|---|
| 5.1 | KOE1 (matrix - flour/corn grit, 1% $CaCO_3$) | 7.20 | 7.76 | 0.51 |
| 5.2 | KOE1 (matrix - flour/corn grit, 1% $CaCO_3$ + polyphenol) | 7.39 | 8.53 | 0.51 |

TABLE 3-continued

Extruded Expanded Snacks containing Krill Oil

| Example | KO emulsion embedded in different matrices | Moisture Content (%) | Oil Content (% dry basis) | Ratio of DHA/EPA |
|---|---|---|---|---|
| 5.3 | KOE2 (matrix - flour/corn grit, 1% CaCO$_3$) | 5.90 | 3.92 | 0.50 |

Liquid feed:
KOE1 = 25% krill oil in water emulsion (neat krill oil emulsion)
KOE2 = 10% krill oil-in-protein carbohydrate emulsion (20% total solids)
KO - Neat krill oil used for preparation of emulsions KOE1 and KOE2 had an DHA/EPA ratio of 0.50
Dry Feed:
5.1 = 45flour:54 corn grit:1 calcium carbonate
5.2 = 45flour:54 corn grit:1 calcium carbonate (with 0.1% polyphenol, epigallocatechin gallate)
5.3 = 45flour:54 corn grit:1 calcium carbonate

The invention claimed is:

1. An encapsulated oil-in-water emulsion comprising a neat phospholipid-containing oil-in-water pre-emulsion encapsulated in an encapsulant material, wherein the oil-in-water emulsion comprises a phospholipid-containing oil comprising triacylcerols and at least 20% by weight phospholipids; and the amount of phospholipid-containing oil in the encapsulated phospholipid-containing oil-in-water emulsion is at least 10% by weight.

2. The encapsulated phospholipid-containing oil-in-water emulsion according to claim 1, wherein the phospholipid-containing oil-in-water pre-emulsion has a phospholipid interface.

3. A food product prepared from the encapsulated oil-in-water emulsion according to claim 1.

4. The food product according to claim 3 which is an extruded food product.

5. A spray-dried powder prepared from the encapsulated oil-in-water emulsion according to claim 1, in the form of a spray-dried powder.

6. The encapsulated phospholipid-containing oil-in-water emulsion according to claim 1 wherein the phospholipid-containing oil comprises about 20% to about 50% by weight phospholipids.

7. The encapsulated phospholipid-containing oil-in-water emulsion according to claim 1 comprising up to about 60% by weight of phospholipid-containing oil.

8. The encapsulated phospholipid-containing oil-in-water emulsion according to claim 1 wherein the encapsulant material comprises a protein and a carbohydrate.

9. The encapsulated phospholipid-containing oil-in-water emulsion according to claim 1, wherein the protein and carbohydrate are at least paritally reacted to form Maillard reaction products.

10. The encapsulated phospholipid-containing oil-in-water emulsion according to claim 1 wherein the encapsulant material comprises at least about 10% of Maillard reaction products.

11. The encapsulated phospholipid-containing oil-in-water emulsion according to claim 1 wherein the triacylglycerols comprise docosahexanoic acid and eicopentanenoic acid.

12. The encapsulated phospholipid-containing oil-in-water emulsion according to claim 1 wherein the encapsulant material comprises a protein, a carbohydrate, or a protein and a carbohydrate.

13. The encapsulated phospholipid-containing oil-in-water emulsion according to claim 12, wherein the protein is selected from the group consisting of milk protein, soy protein, legume protein, cereal protein, animal protein and egg protein, and combinations thereof.

14. The encapsulated phospholipid-containing oil-in-water emulsion according to claim 12, wherein the carbohydrate is selected from the group consisting of monosaccharides, disaccharides, trisaccharides, oligosaccharides and polysaccharides, and combinations thereof.

15. The encapsulated phospholipid-containing oil-in-water emulsion according to claim 12, wherein the carbohydrate is a sugar with a reducing group.

* * * * *